United States Patent [19]
Brady

[11] Patent Number: 4,873,716
[45] Date of Patent: Oct. 10, 1989

[54] PATH ALLOCATION ARRANGEMENT FOR MULTI-TERMINAL GROUPS

[75] Inventor: Patrick K. Brady, Wheaton, Ill.

[73] Assignee: American Telephone and Telegraph Company, AT&T Bell Laboratories, Murray Hill, N.J.

[21] Appl. No.: 290,608

[22] Filed: Dec. 27, 1988

[51] Int. Cl.$^4$ .............................................. H04M 3/02
[52] U.S. Cl. ..................................... 379/134; 379/373; 379/165
[58] Field of Search ............... 379/134, 386, 373, 164, 379/165, 268, 269

[56] References Cited

U.S. PATENT DOCUMENTS 4,631,364 12/1986 Coyne et al. ..................... 379/268
4,791,662 12/1988 Ahnen et al. ..................... 379/158

OTHER PUBLICATIONS

U.S. Ser. No. 07/278,085, 11/30/88, Chandramouli et al.

Primary Examiner—Stafford D. Schreyer
Attorney, Agent, or Firm—Ross T. Watland

[57] ABSTRACT

A method and apparatus for processing calls to a directory number, shared by a multiple number of terminals, in which a switching system selects a preferred terminal for serving the call based on call answering activity. The switching system establishes a connection to the preferred terminal. This system connection is for use in answering the call at the preferred terminal. Although the system connection is established to the preferred terminal, all the terminals sharing the directory number are enabled to answer the call. The arrangement dynamically selects the preferred terminal rather than establishing an initial system connection to only a statically defined terminal.

25 Claims, 7 Drawing Sheets

PATH ALLOCATION ARRANGEMENT FOR MULTI-TERMINAL GROUPS

TECHNICAL FIELD

This invention relates to telecommunication call processing, and more particularly, to shared directory number arrangements in integrated services digital network (ISDN) systems.

BACKGROUND AND PROBLEM

Many businesses require a number of telephone terminals to share a single directory number. The group of terminals sharing a directory number is referred to as a key-system group. A call to the shared directory number may be answered at any of the terminals in the key-system group. When a call is answered, a system connection must be established through the switching system from the originating point for the call, either a line or trunk, to the answering terminal. For a call to a non-shared directory number, this system connection is established before a call is offered to the terminal since only one terminal is addressed by the call. However, if a directory number is shared, immediately establishing connections for all terminals sharing the directory number wastes system resources since at most one terminal will answer. In addition, some system architectures may not allow for establishing multiple paths.

Establishing this connection before answer reduces the delay that a customer would otherwise experience when answering a call. Customers expect that as soon as they lift the telephone handset they may begin speaking. The answer delay which occurs if the system connection is not already established often clips the speech of the person answering the call. In a business environment, where key-system groups are often used, an executive may answer the phone simply by stating his or her name. If answer delay occurs, clipping may cause the executive's name to be unrecognizable. For example, the executive may answer the phone with "Phillips," but because of clipping from answer delay the calling party may hear only "ips." This is an extremely annoying problem. In addition, the caller will be confused by what he has heard and may be uncertain whether he has reached the correct party. Clipping is even more likely to occur when a speakerphone is used. With a traditional telephone terminal, the answering party does not begin speaking until he lifts the telephone handset from the cradle to his ear. There is no such natural delay with a speakerphone. The user expects that he can start talking over the speakerphone as soon as he presses a button to answer a call.

Establishing the system connection before offering the call to a terminal also avoids error conditions in which a call alerts at a customer's terminal but the customer's attempt to answer the call fails. In some cases the system cannot establish the connection. This happens when an error occurs or when resources are not available. If the system connection is attempted before the call is offered to the terminal, the called terminal is not rung when the path cannot be established. This is more desirable than ringing the terminal and discovering when someone attempts to answer that the system connection cannot be established.

Earlier systems attempted to solve these problems by immediately establishing a connection from the originating point for each incoming call to a predefined lead terminal in the key-system group and then offering the call to all terminals in the key-system group. In these systems, if the call is answered by the lead terminal, good performance results. However, if any terminal other than the lead terminal answers the call, answer delay may be excessive since no connections have been established for the other terminals. In addition, error conditions could occur in which a connection could not be established to one of the other terminals after an answer attempt.

The lead terminal designation is defined by static data stored in the switching system and initially set at subscription time. Changing the terminal designated as the lead terminal requires a service order. A service order is a means for the customer to request changes to static data in the switching system. Once established, the lead terminal designation is rarely changed. A number of restrictions limit the terminals in the key-system group that may be identified as the lead terminal. For example, the lead terminal must have the maximum number of call appearances for the directory number shared by the key-system group. The lead terminal designation is normally changed only when terminals are added to the group or the groups is reconfigured.

This answer delay problem is of particular concern when the key system group is distributed to a plurality of switching modules. In typical applications, it is important that the members of a key-system group can be spread across a number of switching modules to enhance reliability and provide for administrative convenience in changing group members. In such a distributed system, the answer delay problem becomes more cumbersome. In an example distributed system, a connection must be established from an originating switching module for the call through a time-multiplexed switch to the switching module to which the called terminal is connected. Further connections must be established within that switching module. These include a connection through a time-slot interchange unit to an integrated services line unit. Additional connections are required within the line unit to complete the connection to the line card connected to the called terminal. Establishing such connections after an answer request is received significantly adds to answer delay. If the earlier method of immediately establishing a system connection to the lead terminal is used, a new connection from the time-multiplexed switch to the line card must be established when an answer request is received from a terminal connected to a different switching module than the lead terminal.

Thus, a recognized problem in the art is the customer perceivable answer delays and errors that occur when an incoming call is answered at a terminal in a multi-terminal group of a switching system without a system connection initially established to the terminal.

SOLUTION

This problem is solved with an illustrative call processing method and apparatus in which a system connection is established to a terminal advantageously selected by the system, based on call answering activity, as a preferred terminal for serving an incoming call. The system selects the most likely terminal to answer the call as the preferred terminal based on data that the system maintains concerning past call answering activity. Significantly, the connection is established before any answer requests are received for the call, thus alleviating customer perceivable answer delay at the preferred terminal. This also reduces the possibility that the customer at the preferred terminal will encounter errors caused by the system being unable to establish a path. This possibility is reduced since the system established the path before the customer even attempts to answer. Advantageously, both problems are alleviated at the terminal selected by the system as the most likely terminal to answer to call. Although the system connection is established to the preferred terminal, all the terminals sharing the directory number are enabled to answer the call. The arrangement dynamically selects the preferred terminal rather than establishing an initial system connection to only a statically defined terminal.

In a method in accordance with the invention, calls to a directory number shared by a multiple number of terminals connectable to a switching system are processed as follows. The system selects a preferred terminal to serve a subsequent call to the shared directory number. Before the system receives an answer request for the call, the system establishes at least a partial connection to the preferred terminal. This connection is for use in answering the call at the preferred terminal. The system also enables the other terminals that share the directory number to answer the call.

Illustratively, the designation of the preferred terminal is advantageously changed among the terminals in the key-system group in response to call answering activity. In this way, the system adapts to changes in the call answering activity of the key-system group. The system predicts the key-system group terminal that will answer a subsequent call to the shared directory number and selects this terminal as the preferred terminal. This allocates system resources to the terminal predicted to be the most likely terminal to use the resources.

In one specific embodiment of the invention, the system selects the last terminal to answer an incoming call to the shared directory number as the preferred terminal for answering a subsequent call to the directory number. This selection is based on the assumption that a terminal that recently answered a call is likely to answer the next call. Consider an example key-system group including two terminals. One terminal belongs to an executive and the other terminal to a secretary. Assume that the secretary is repeatedly answering calls to the shared directory number because the executive is out of the office. The initial system connection for a subsequent call is established to the secretary's terminal since it was used to answer the last call. Satisfactory service is advantageously provided to the terminal at which calls are being repeatedly answered.

According to one embodiment, history data is maintained defining call answering activity at the terminals in the key-system group. The system selects, based on the history data, a preferred terminal to serve a subsequent call. In a first exemplary method, the history data defines the last terminal to answer a call. In a second exemplary method, the history data defines the last terminal to answer a call to the directory number. In a third exemplary method, the history data defines call answering activity by the key-system group terminals for the last "N" calls to the shared directory number. The history data is updated each time a call is answered by a terminal in the key-system group. Thus, the history data used in selecting the preferred terminal advantageously represents current call answering activity of the key-system group.

In other exemplary arrangements, the system establishes initial system connections to both a predefined terminal and a terminal selected by the system as a preferred terminal. Thus, when either terminal answers the call, it will receive satisfactory service. In a first method, the preferred terminal is selected from the terminals other than the predefined terminal so two initial system connections are always established. In a second method, the predefined terminal may be selected as the preferred terminal. Accordingly, the number of initial system connections established by the second method varies with the preferred terminal selection. Both of these methods insure satisfactory service at the predefined terminal but not at the expense of the other terminals as did the known method of only establishing an initial system connection to a predefined lead terminal.

Alternatively, more than one preferred terminal may be selected and initial system connections established to each of the preferred terminals. This may be advantageous for a large key-system group.

In accordance with an aspect of the invention, the system monitors the level of service being provided to a predefined terminal. The system does this by recording occurrences in which the terminal answers a call without being selected as the preferred terminal. If the number of such occurrences exceeds a first predefined threshold, the system establishes the initial system connection to the predefined terminal for subsequent calls. In a further illustrative arrangement, the system continues to establish the initial system connection to the predefined terminal, regardless of which terminal is designated as the preferred terminal, until the number of occurrences falls below a second predefined threshold. At that time, the system establishes system connections for subsequent calls to the terminal designated as the preferred terminal.

In another exemplary method, the system includes various sets of instructions for selecting a preferred terminal. The system applies a first set of instructions and selects one of the terminals in the key-system group as the preferred terminal. Subsequently, the system applies a second set of instructions and selects another one of the terminals in the key-system group as the preferred terminal. For example, assume the system executes the first set of instructions during the hours of 8:00 a.m. through 5:00 p.m. and the second set of instructions during the remainder of the day. This would allow an initial system connection to be provided to one terminal during business hours and a connection to another terminal to be made for coverage during the remainder of the day.

The operations described above are performed by an exemplary apparatus for processing calls to a directory number shared by a multiple number of terminals. This apparatus includes a switching system connectable to the multiple terminals and a control means for establishing connections through the switching system. The control means is operated under the control of a program to perform the operations described above.

DETAILED DESCRIPTION

Figure 1:
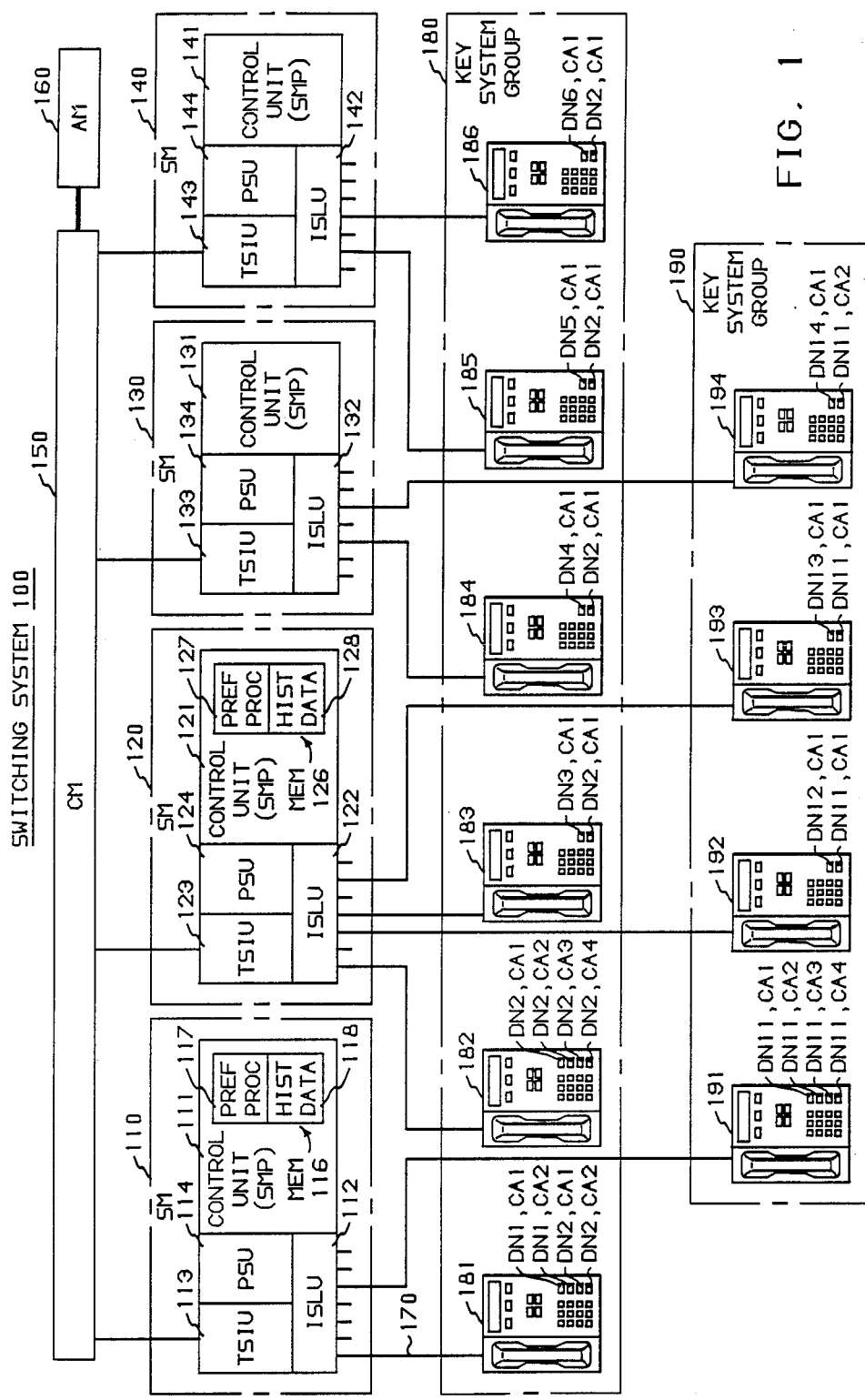
FIG. 1 is a block diagram of an illustrative, distributed control switching system that controls initial system connections for incoming calls to key-system groups of terminals in the manner of the present invention.

The principles of the invention are described in the context of a distributed control, integrated services digital network (ISDN) switching system 100 (FIG. 1). An integrated services digital network is defined as a network evolved from the telephony integrated digital network that provides end-to-end digital connectivity to support a wide range of services, including voice and nonvoice services, to which users have access by a limited set of standard multipurpose customer interfaces. System 100 is connectable to analog or digital terminals, however, only digital ISDN terminals 181 through 186 and 191 through 194 are shown in FIG. 1. (Although not shown in FIG. 1, system 100 is also connectable via trunks to terminals associated with other switching systems.) System 100 includes a number of switching modules (SMs) each associated with a different subset of terminals. For example, switching module 110 is associated with terminals 181 and 191, switching module 120 is associated with terminals 182, 183, 192 and 193, switching module 130 is associated with terminals 184 and 194, and switching module 140 is associated with terminals 185 and 186. Each switching module includes a control unit or switching module processor (SMP) for controlling connections to and from its associated subset of terminals. Switching module 110, for example, includes control unit 111 for controlling connections to and from terminals 181 and 191. Similarly, switching modules 120, 130, and 140 include control units 121, 131, and 141, respectively.

Each ISDN user terminal communicates with system 100 in two 64 kilobits per second channels referred to as B-channels and in one 16 kilobits per second channel referred to as a D-channel. In the present embodiment, one B-channel is used to convey digitized voice samples at the rate of 8000, eight-bit samples per second and the other B-channel is used to convey data at a rate of 64 kilobits per second. (However, each B-channel could be used for either voice or data traffic.) The D-channel is used both to convey signaling packets and to effect message signaling between ISDN terminals and switching module control units, and to convey data packets between different ISDN terminals.

In the present exemplary embodiment, information is conveyed between an ISDN terminal and system 100 using a four-wire, digital subscriber line (DSL) 170 using one pair of wires for each direction of transmission. DSL 170 transmit a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. DSL 170 represents what is referred to by the International Telegraph and Telephone Consultative Committee (CCITT) as the T-interface. The use of the T-interface is only exemplary, however, as the invention is equally applicable to systems using other access methods.

Signaling packets are conveyed between terminals and the switching module control units enclosed in level 2 (link-level) frames in accordance, for example, with the standard LAPD protocol. The exemplary signaling messages used for the control of circuit-switched voice calls are in accordance with CCITT recommendation Q.931.

The architecture of system 100 has a communications module (CM) 150 as a hub, with the switching modules 110, 120, 130, and 140, and an administrative module (AM) 160 emanating therefrom. Each switching module includes an integrated services line unit (ISLU) which terminates the digital subscriber lines and provides access to a time-slot interchange unit (TSIU) and a packet switching unit (PSU). For example, in switching module 110, ISLU 112 terminates the digital subscriber lines, and TSIU 113 and PSU 114 respectively provide circuit-switched and packet-switched connections to and from the associated terminals under the control of control unit 111. Switching modules 120, 130 and 140 similarly include ISLUs 122, 132, and 142, TSIUs 123, 133, and 143, and PSUs 124, 134, and 144.

Communications module 150 includes a time-shared, space-division switch or time-multiplexed-switch, that provides 64 kilobits per second circuit-switched paths between switching modules. It supports B-channel traffic between switching modules, as well as packet traffic between PSUs in different switching modules. The switching module control unit provides call processing and overall control and maintenance functions for the switching module. Switching module control units in different switching modules communicate with each other and with the administrative module 160 through a message switch (not shown) in the communications module, using an internal message protocol. The architecture provides flexibility in placing specific processing functions in specific processing elements. The general strategy is to place much of the required processing capability in the switching module control units, but to reserve the administrative module for those functions that are inherently centralized. The call processing functions can for example be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

Figure 2:
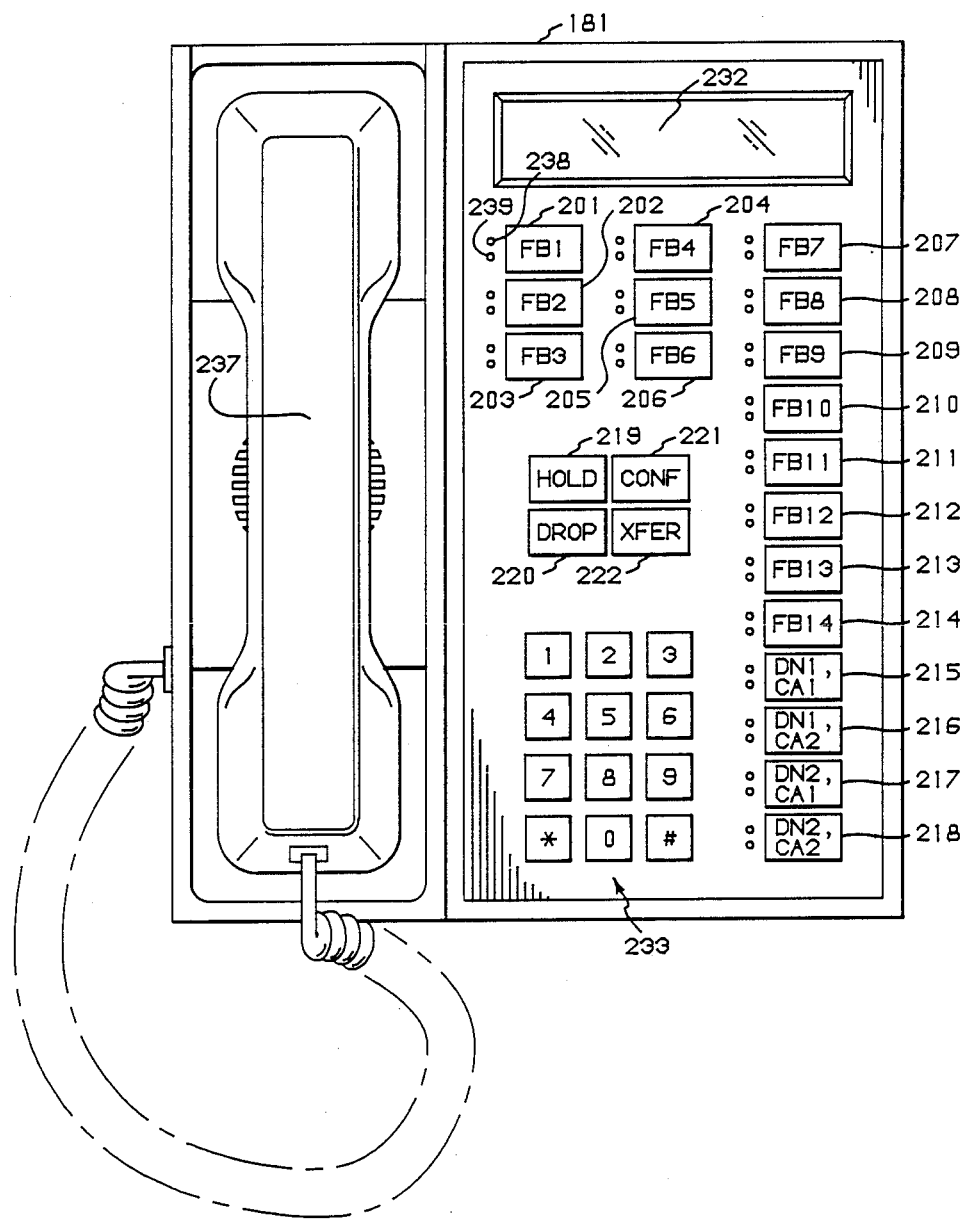
FIG. 2 is a more detailed depiction of one of the terminals of FIG. 1.

An exemplary ISDN terminal 181 is shown in FIG. 2. Terminal 181 includes a handset 237, a telephone keypad 233 and a display 232 for visually displaying messages. Terminal 181 also includes 22 buttons 201 through 222. Buttons 219 through 222 are only used for the HOLD, DROP, CONFERENCE and TRANSFER functions. The remaining buttons are configured at terminal 181 such that buttons 201 through 214 are feature buttons and buttons 215 through 218 are call appearances. However, the identical terminal could be configured to meet different user requirements, for example such that buttons 201 through 206 are call appearances and button 207 through 218 are feature buttons. Each call appearance or feature button has associated in-use and status lamps. For example, button 201 has associated in-use lamp 238 and status lamp 239. The in-use lamp is lit for a call appearance when that call appearance is the selected call appearance at the terminal. The status lamp is used to indicate the various stages of the call, alerting, active, etc., or to indicate the activation of feature buttons.

The terminals shown in FIG. 1 comprise two key-system groups 180 and 190. A key-system group is a set of terminals that share one or more call appearances for a single directory number (DN). Dynamic history and status data for a key-system group are stored by the control unit of the switching module connected to a lead terminal of the group. For example, control unit 111 includes history and status data 118 in memory 116 and control unit 121 includes history and status data 128 in memory 126. Certain rules define the terminal selected as the lead terminal. Each terminal has a primary DN. If a group shared DN is primary at any terminal, that terminal is selected as the lead terminal. The lead terminal has the maximum number of call appearances for the shared DN. If the group shared DN is not primary at any terminal, then the lead terminal is selected as follows. If one terminal of the group has more call appearances of the shared DN than any of the other group terminals, the terminal having more call appearances is selected as the lead terminal. If multiple terminals of the group each have the same maximum number of call appearances of the shared DN but one of those terminals is on a switching module that has more call appearances of the shared DN than the other terminals, the terminal on the switching module having more call appearances is selected as the lead terminal. The control unit that stores the dynamic history and status data for a key-system group is referred to herein as the lead control unit. The lead control unit is the control unit of the switching module connected to the lead terminal.

Key-system group 180 comprises terminals 181 through 186, having primary DNs DN1 through DN6, respectively. DN2 is the shared DN for group 180, terminal 182 is the lead terminal and control unit 121 is the lead control unit. Terminal 182 has the maximum number of all appearances for DN2, four. Terminal 182 is shown second from the left in FIG. 1. The dynamic busy/idle status information for the four call appearances of DN2 is stored in a busy/idle table in history and status data 128 of lead control unit 121. Key-system group 190 comprises terminals 191 through 194, having primary DNs DN11 through DN14, respectively. DN11 is the shared DN for group 190, terminal 191 is the lead terminal and control unit 111 is the lead control unit. Terminal 191 has the maximum number of call appearances for DN11, four. The dynamic busy/idle status information for the four call appearances of DN11 is stored in a busy/idle table in history and status data 118 of lead control unit 111.

The processing of calls to and from terminals of key-system groups is performed cooperatively by the control units associated with those terminals. The overall processing task is broken down into a number of major tasks called program processes. A process comprises a collection of procedures, each performing some subtask of the process. Associated with a process is a block of memory called a process control block which stores data applicable to the entire process, and a block of memory called a stack which stores data useful to the individual procedures of the process. Processes communicate with each other via messages. The same type of message is used in communicating with another process in the same processor, or another process in a different processor. In system 100, processes are of two types: terminal processes and system processes. System processes remain in existence as long as the system is operational. Terminal processes on the other hand remain in existence only for the duration of individual calls or service events such as diagnostic tests or service evaluation.

Each lead control unit includes a preference procedure to use in controlling system connections initially established in response to incoming calls to a shared directory number. For example, control unit 111 includes preference procedure 117 and control unit 121 includes preference procedure 127. Based on the dynamic history and status data for a key-system group, the preference procedure determines that certain terminals in the key-system group are preferred terminals. When an incoming call arrives for a directory number shared by a key-system group, system connections are immediately established to terminals identified by the preference procedure as preferred terminals. (These system connections are alternatively referred to herein as paths.) The preferred terminal or terminals for a key-system group are not statically assigned. Instead, the preferred terminal designation adapts to accommodate variations in answer behavior at the terminals in the key-system group. First, procedures for determining the preferred terminal or terminals for a shared directory number will be discussed and then examples will be given of how these procedures are used in processing calls to shared directory numbers.

The preference procedure examines the dynamic history and status data for the key-system group and applies specific rules to these data. This results in one or more terminals being determined as the preferred terminals. The procedure embodies rules that project future terminal answering behavior based on past answering behavior or that include other knowledge of expected answering behavior. In a perfect system, an initial system connection would always be established to a terminal before a request is received from the terminal to answer a call. The preference procedure projects which terminal will answer the call. Significantly, the preference procedure enables the switching system to adapt to changes in answering behavior. In comparison, earlier systems, which assumed that the lead terminal would answer the call and assigned the path accordingly, could not adjust to changes in answering behavior.

Since system 100 is a distributed control system, the procedure for determining the preferred terminal is executed by a system process in the individual control units of system 100. The preference procedure is embodied in a computer program. The selection rules are coded as program instructions, which operate on dynamic system data. In other systems with centralized control, these procedures could be executed in a central processor. The following discusses preference procedure 117 but applies also the other preference procedures.

Figure 3:
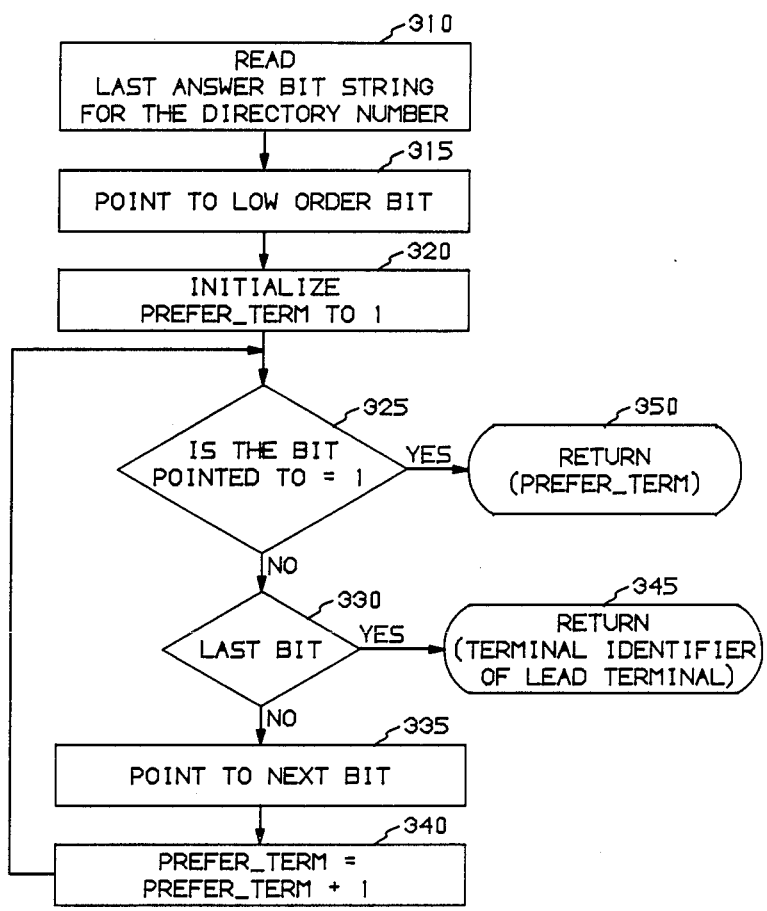
FIG. 3 is a flow chart for an illustrative call processing program used by control units of FIG. 1 to control the initial system connections made for incoming calls for key-system groups of terminals.
Figure 4:
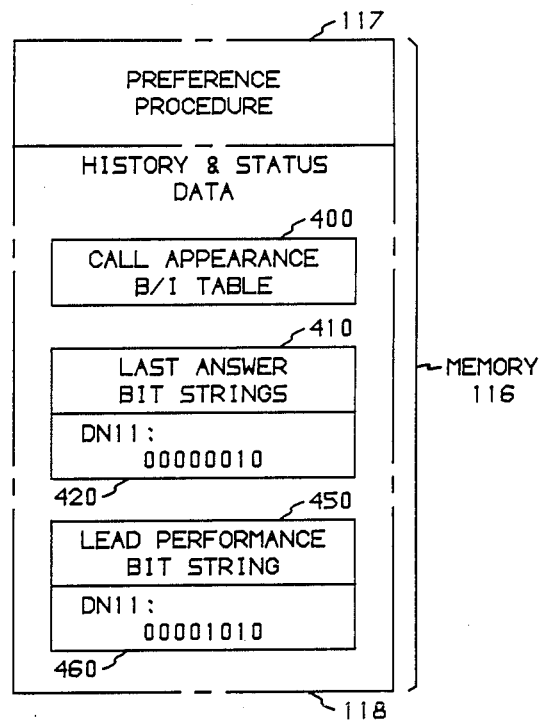
FIG. 4 shows dynamic switching system data stored in the system of FIG. 1 and used by the programs of FIG. 3,5,6, and 7.

FIG. 3 is an example of one illustrative embodiment of preference procedure 117. This procedure operates on history and status data 118 (FIG. 4). This procedure projects which terminal will answer the next incoming call be examining data defining how the last call was answered. The last terminal to answer a call is assumed to be the most likely to answer subsequent calls and is selected as the preferred terminal. In this illustrative embodiment, history and status data 118 includes a bit string in last answer bit string table 410 (FIG. 4) for each key-system group for which control unit 121 is the lead control unit. FIG. 4 shows a last answer bit string in block 420 for the key-system group that shares DN11. Since up to eight terminals may share a directory number, each of these bits strings includes eight bits. One of the bits is set to 1 to indicate the terminal that answered last. For each key-system group, the lead control unit maintains data relating a unique one of the numbers 1 through 8 to each of the terminals in the group. The bits in each of the last answer bit strings correspond from right to left to the terminals 1 through 8 for that group. The bit corresponding to the terminal that most recently answered a call for the group shared directory number is set to 1. For example, the last answer bit string in block 420 for directory number DN11 (FIG. 4) has a 1 at bit position two and 0's in all other positions. This indicates that terminal 2 was the last terminal to answer a call for directory number DN11.

The procedure begins with block 310 where the system process executing the procedure reads the last answer bit string for the directory number. Processing continues with block 315 where a pointer is initialized to point to the low order bit of the last answer bit string. At block 320, a local variable "prefer_term" on the process stack, is initialized to 1. Next, at block 325 a check is made whether the bit pointed to in the last answer bit string is a 1. If the bit is not a 1, processing continues with block 330. At block 330, a check is made whether this is the last bit. If this is not the last bit, processing continues with block 335 where the pointer is advanced to the next bit in the bit string. Next, at block 340, the local variable "prefer_term" is incremented by 1. After block 340, the above steps are repeated beginning with block 325.

If at block 330 it is determined that this is the last bit, an error condition exists. At least one of the bits in the last answer bit string should be set to 1. In this case, all bits were equal to zero. Under this error condition, a default terminal is designated as the preferred terminal. The lead terminal is chosen as the default terminal for this embodiment but another terminal could be chosen. Processing continues with block 345 where the procedure returns the terminal identifier of the lead terminal. This "error" will be corrected when the last answer bit string is updated with the next answering call.

If at block 325 it is determined that the bit pointed to is a 1, processing continues with block 350. In this case, the terminal identifier of the preferred terminal is specified by the local variable "prefer_term", and the procedure returns the value of "prefer_term." This terminal was the last terminal recorded as answering a call to the shared directory number.

Note that the procedure defined by the flow chart of FIG. 3 always returns a terminal identifier. A terminal identifier is returned even if the last answer bit string is corrupted or has been reinitialized. The last answer bit string should contain a single 1. However, since only the first 1 will be used in selecting the preferred terminal, it does not matter if the data has been corrupted. If the bit string does not contain any 1s, a default terminal (in this embodiment the lead terminal) is defined as the preferred terminal. The bit string will be corrected when the next modification is made to the bit string.

The procedure for updating the last answer bit string is advantageously quite simple and does not significantly increase call processing overhead. When a message is received by the lead control unit indicating that a call to a shared directory number has been answered at one of the terminals in the key-system group, the lead control unit updates the corresponding last answer bit string. The last answer bit string is updated with a 1 in the bit position corresponding to the terminal that answered the call and zeroes in all other bit positions. The last answer bit string is continually updated as calls to the shared directory number are answered. The procedure defined by FIG. 3 uses this updated data to determine the preferred terminal. Thus, the selection of a preferred terminal is based on current information.

The procedure defined by the flow chart of FIG. 3 does not favor the lead terminal over the nonlead terminals. In practice, however, the lead terminal of a key-system group may be assigned to the "boss" of the group. This person may also be the person who complains the loudest about poor service. In a further illustrative embodiment, a throttle procedure insures that the lead terminal is not given poor service. This procedure could be used to insure that any predefined terminal, not just the lead, does not experience poor service. The throttle procedure examines how successful the preference procedure has been in predicting the terminal that will answer a call. In particular, the throttle procedure determines how successful the preference procedure has been in predicting when the lead terminal will answer. The lead terminal is considered to be given poor service if the user of the lead terminal repeatedly answers calls when an initial system connection has not been established to the lead terminal. When this occurs an adjustment is made in the way in which paths are assigned. This adjustment switches to always assigning the initial path to the lead terminal. A path is always assigned to the lead terminal until the procedure determines, in a manner described later herein, that satisfactory service would be provided to the lead terminal if the original arrangement for selecting a preferred terminal is resumed. With this throttle procedure, the lead terminal is guaranteed a consistently high quality of service.

Figure 5:
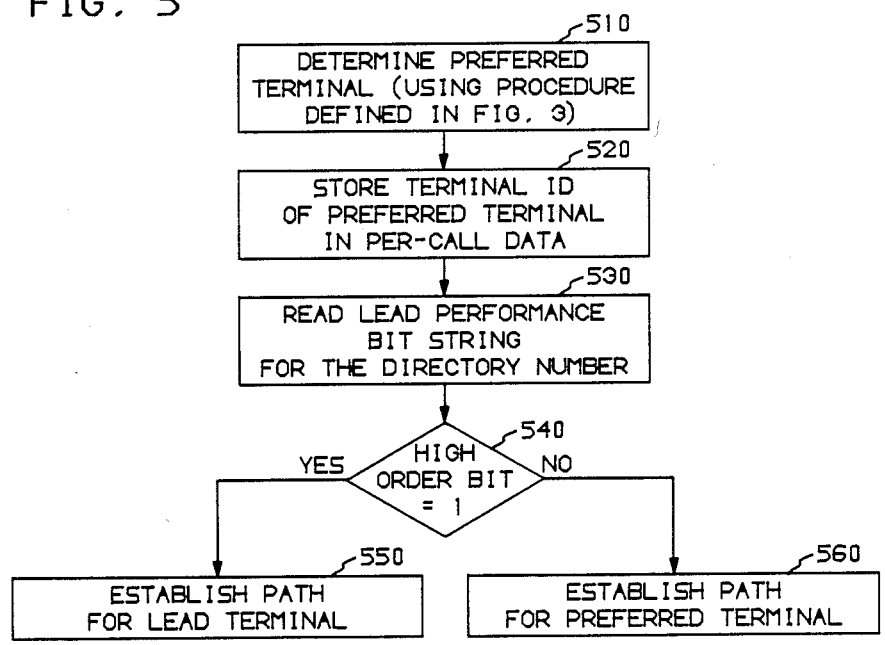
FIG. 5 is a flow chart for an illustrative program used to monitor the performance of the call processing program defined by the flow chart of FIG. 3.
Figure 6:
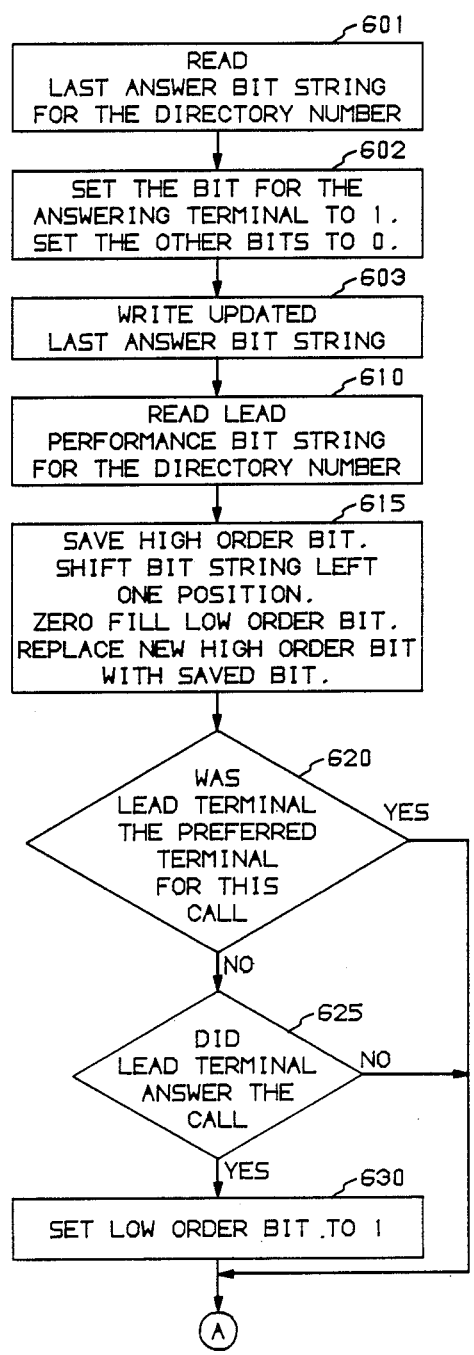
FIG. 6 and FIG. 7 are flow charts for an illustrative program used to update data defined in FIG. 4 and used by the program defined by the flow chart in FIG. 5.

In illustrative system 100, this performance check is embodied in procedures defined by the flow charts of FIG. 5 and FIG. 6. The flow chart of FIG. 5 describes how the throttle procedure is used in processing a call to a shared directory number. The flow chart of FIG. 6 defines how the throttle procedure is activated and how certain data reflecting system performance are updated.

System performance for the lead terminals is defined by lead performance bit strings. These bit strings are maintained in each lead control unit. Lead performance bit string table 450 for control unit 121 is defined in FIG. 4. Each bit string defines the service experienced by the corresponding lead terminal for the last seven calls. The bit string also uses the high order bit to indicate whether throttling is currently activated for the key-system group. The other bits define incidents of unsatisfactory service. Unsatisfactory service occurs when the lead terminal answers a call without initially having been assigned a path.

The procedure defined by the flow chart of FIG. 5 is executed by a system process in a lead control unit when determining to which terminals in the key-system group an initial system connection should be established. Execution begins with block 510 where the system process executes the procedure defined by the flow chart of FIG. 3 to determine a preferred terminal for the key-system group.

Processing continues with block 520 where the system process stores the terminal identifier of the preferred terminal in per-call data that is maintained for the duration of the call. This data is stored to allow the history data for a directory number to be updated while other calls to the directory number are still alerting. After the update, the lead answer bit string will not necessarily designate the same terminal as the preferred terminal. However, the original designation is required to correctly respond to the answering of the alerting calls since a check is made whether the lead terminal was the preferred terminal. Other methods for handling this problem exist. For example, the procedure could only allow updates to the history data to be made only for calls that are answered when no other calls for the key-system group remain in the alerting state.

If throttling is activated for the key-system group, an initial connection will be established to the lead terminal rather than to the preferred terminal. However, the preferred terminal still must be determined so that an analysis may be made of whether the procedure for determining the preferred terminal would be providing adequate service to the lead terminal. Next, at block 530, the system process reads the lead performance bit string for this directory number. At block 540, a check is made whether the high order bit of the lead performance bit string is equal to 1. If the bit is equal to 1, throttling is activated for the key-system group. In this case, processing continues with block 550 where the initial path for the call is established to the lead terminal. If the check at block 540 showed the high order bit not equal to 1, throttling is not activated for the key-system group and processing continues with block 560. At block 560, the initial path for the call is established to the preferred terminal.

The flow chart of FIG. 6 defines how the throttling is activated and how the last answer and lead performance bit strings are updated. A system process executes the procedure defined by the flow chart of FIG. 6 when a message is received indicating that a call to a directory number shared by a key-system group has been answered by one of the terminals in the key-system group. The procedure defined by the flow chart of FIG. 6 updates the history data and examines the performance at the lead terminal for this call.

First, the procedure updates the last answer bit string. Processing begins with block 601 where the system process reads the last answer bit string for the shared directory number. Next, at block 602, the system process sets the bit corresponding to the terminal that answered the call to 1 and sets the other bits to 0. At block 603, the system process writes the updated last answer bit string.

Next, the lead performance bits are updated. Processing continues with block 610 where the lead performance bit string for the directory number is read. The new high order bit is replaced with the saved bit. The high order bit indicates whether throttling is currently activated. The other seven bits indicate the service received by the lead terminal during seven previous calls. A bit set to 1 indicates that the lead terminal answered a call when it had not been assigned a path. A zero in a bit position indicates that the lead terminal answered a call and had been assigned a path or that the lead terminal did not answer the call. Thus, a 1 in a bit position indicates that the lead terminal may have experienced answer delay. A large number of 1's in this bit string indicates that the lead terminal is not receiving quality service. Next, at block 615 the high order bit from the bit string is saved and the remaining bits are shifted to the left one position and zero filled at the low order bit. By shifting the bit string, the procedure removes the oldest data and makes room for new data.

Figure 7:
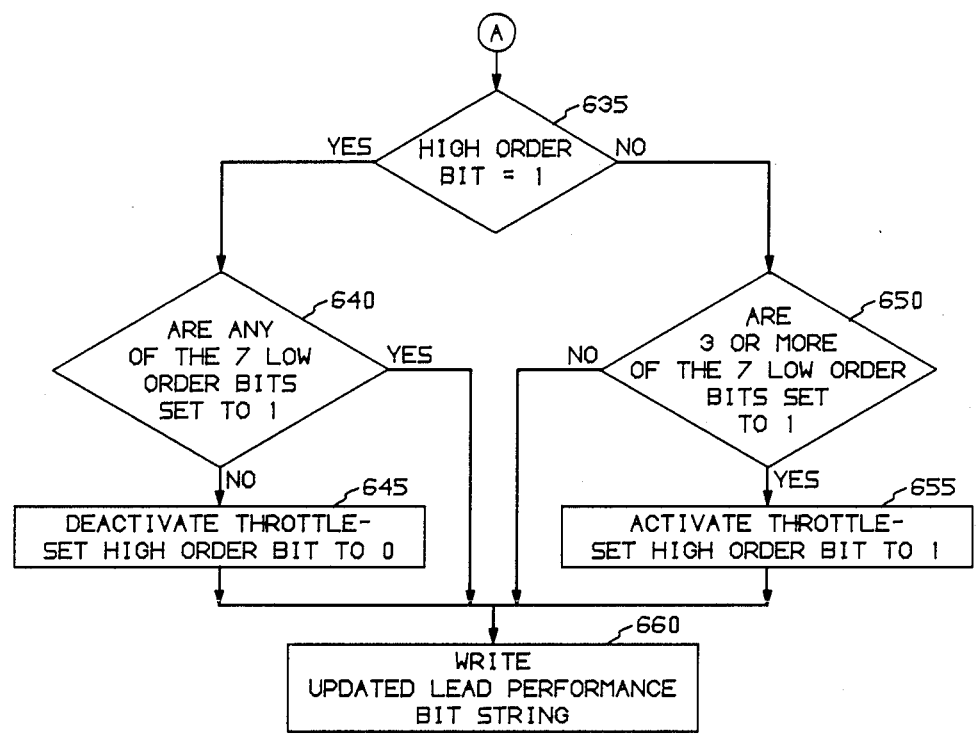

Processing continues with block 620 where a check is made whether the lead terminal was the preferred terminal for this call. In this embodiment, the process reads stored per-call data for the directory number to determine the terminal identifier of the terminal originally selected as the preferred terminal. The process then compares the stored terminal identifier of the preferred terminal with the terminal identifier of the lead terminal. Note that the lead terminal being assigned a path does not necessarily imply that it was the preferred terminal as throttling could be activated. This check looks at whether the lead terminal would have received satisfactory service if throttling was not activated. If the lead terminal was the preferred terminal there is not need to make further checks. The lead terminal received satisfactory service in this case. Processing continues with block 635 (FIG. 7). There is no need to update the lead performance bit string because the low order bit has already been initialized to zero and zero indicates satisfactory service. If the lead terminal was not the preferred terminal for this call, processing continues with block 625. At this block, a check is made whether the lead terminal answered the call. If the lead terminal did not answer the call, it does not matter whether the lead terminal was assigned a path. Satisfactory service was received and processing continues with block 635 (FIG. 7). If the lead terminal did answer the call, then processing continues with block 630. In this case, unsatisfactory service was obtained for the call. At block 630, the low order bit of the lead performance bit string is set to 1. This indicates unsatisfactory service for this call. However, unsatisfactory service for one call may not require throttling to be activated. Processing continues with block 635 (FIG. 7).

Beginning at block 635, the process checks whether throttling should be activated or deactivated based on recent performance at the lead terminal. Beginning with block 635, a check is made whether the high order bit of the lead performance bit string is set to 1. If this bit is set to 1, throttling is activated for the key-system group and processing continues with block 640 where a determination will be made whether throttling should be deactivated. At block 640 a check is made whether any of the seven low order bits are set to 1. Once throttling has been activated for the key-system group a higher level of performance is expected before throttling is deactivated. In this implementation, that level of performance has been set at seven calls recorded in a row indicating satisfactory service at the lead terminal. If any of the seven low order bits are set to 1, this threshold has not been met. If this is the case, processing continues with block 660 where the lead performance bit string is updated. If at block 640 it is determined that none of the seven low order bits are set to 1, throttling should be deactivated since the performance criteria of seven satisfactory calls in a row has been met. Processing continues with block 645 where throttling is deactivated by setting the high order bit to zero and processing continues with block 660. If the check at block 635 determined that the high order bit was not set to 1, throttling is not activated for the key-system group. Processing continues with block 650 where a check is made whether throttling should be activated. In this implementation, throttling is activated when unsatisfactory service for the lead terminal is obtained on three of the past seven recorded calls. Thus, at block 650, a check is made whether three or more of the low order bits are set to 1. If more than three of these bits are not set to 1, processing continues with block 660 and throttling is not activated. However, if more than three of the bits are set to 1, processing continues with block 655 where the throttling is activated by setting the high order bit to 1. After setting this bit, processing continues with block 660. At block 660 the process writes the updated lead performance bit string. This new bit string is then used to determine for subsequent calls whether throttling is activated.

In this illustrative embodiment, throttling is activated when more than three calls of the last seven received unsatisfactory service and throttling is deactivated when the past seven calls have received satisfactory service. Other tests may be made to determine whether throttling should be activated or deactivated.

In other exemplary embodiments of preference program 117, more than one preferred terminal is determined and accordingly, more than one switching system path is established. For example, in one such arrangement the last two terminals to answer calls to the directory number are selected as preferred terminals.

In another alternative, history data is maintained on the last one of the terminals in the key-system group to answer any call not just a call to the shared directory number. The preferred terminal is then selected based on this call answering activity.

In another alternative, a preferred terminal is selected using the procedure outlined in the flow chart of FIG. 3 and a path is also always established to a predefined terminal, such as the lead terminal. Thus, two paths are established whenever the predefined terminal is not selected as the preferred terminal. In a similar arrangement, the procedure outlined in the flow chart of FIG. 3 is modified to always return a preferred terminal that is not the predefined terminal. Using this modified procedure, two paths are always established. One path to the predefined terminal and the other to the preferred terminal. These arrangement always provide suitable performance for the predefined terminal and in addition provide suitable performance for other terminals that repeatedly answer calls. When the predefined terminal is the lead terminal, throttling is not required since a path is always established to the lead terminal.

In other illustrative embodiments, additional history information is maintained to aid in the selection of a preferred terminal. For example, in one such arrangement, history data defining call answering activity for said directory number for the last "N" calls is maintained. The system determines the preferred terminal based on these last "N" answers, where "N" is a positive integer greater than 1. In one such arrangement, the system maintains a table, defining for each call from the most recently recorded to the Nth earlier call, which terminal in the key-system group answered the call. In one such embodiment, the system weights the most recent answers more heavily in determining the preferred terminal.

In other exemplary embodiments, predetermined selection criteria or rules are used in determining the preferred terminal. These selection criteria operate on dynamic system parameters. The selection criteria are entered into the system at subscription time. For example, assume that an executive usually leaves the office between 12:00 and 1:00 for lunch. During this hour, all calls to the executive's directory number are answered by a secretary who shares the directory number. In this case, the dynamic system parameter is time of day and the selection criteria define which terminal should be selected at a particular time.

Other selection criteria, may also be entered into the system at subscription time. For example, one particular executive may never answer calls and instead always bridge onto calls answered by a secretary. This arrangement differs from an arrangement in which the executive always answers calls whenever he or she is in the office and the phone rings. The system applies these rules about answering patterns for a specific key-system group in selecting the preferred terminal.

The call processing actions, including selection of a preferred terminal, for a call terminating to a key-system group are now described with reference to an exemplary call to DN11. This example shows the selection of a preferred terminal in the context of normal processing of an incoming call. The last to answer method, as illustrated by FIG. 3, is used for determining the preferred terminal. The example also shows how throttling is activated. A translation of the called directory number DN11 results in a determination of the system 100 port connected to terminal 191 since terminal 191 is the lead terminal for the key-system group 190 (FIG. 1) having the shared directory number DN11. As a result of the translation, a MGLN_TERM message is received by a terminating system process TMSP111, in control unit 111. Process TMSP111 effects a reading of call appearance busy/idle table 400 (FIG. 4) to determine if an idle call appearance is available. Assume that call appearance CA1 is available. The status of call appearance CA1 is changed from idle to busy in busy/idle table 400. Next, process TMSP111 determines the preferred terminal for the key-system group by executing the procedures defined by the flow chart of FIG. 5. This involves first executing the procedure defined by the flow chart of FIG. 3 to determine the terminal currently defined as the preferred terminal. The contents of the last answer bit string for directory number DN11 are shown in FIG. 4. Based on the last answer bit string, process TMSP111 determines that terminal 192 is the preferred terminal for directory number DN11. Process TMSP111 stores the identification of the preferred terminal in per-call data stored for this call. Terminal 192 is not the lead terminal for this key-system group. Next, process TMSP111 determines if throttling is activated. The current contents of the lead performance bit string for directory number DN11 is shown in FIG. 4. The high order bit of the lead performance bit string is set to a zero indicating that the throttle mechanism is not activated.

In system 100, each terminal in the group may not have the full set of call appearances for the shared directory number. Process TMSP111 checks whether the preferred terminals, terminal 192, has the selected call appearance CA1. Other systems that do not have a variable number of call appearances for the shared directory number would not require this check. If the preferred terminal does not have the selected call appearance, TMSP111 designates the lead terminal as the preferred terminal and updates the per-call data stored for the call to save that designation. Terminal 192 has the selected call appearance CA1 so the preferred terminal designation is not changed.

Figure 8:
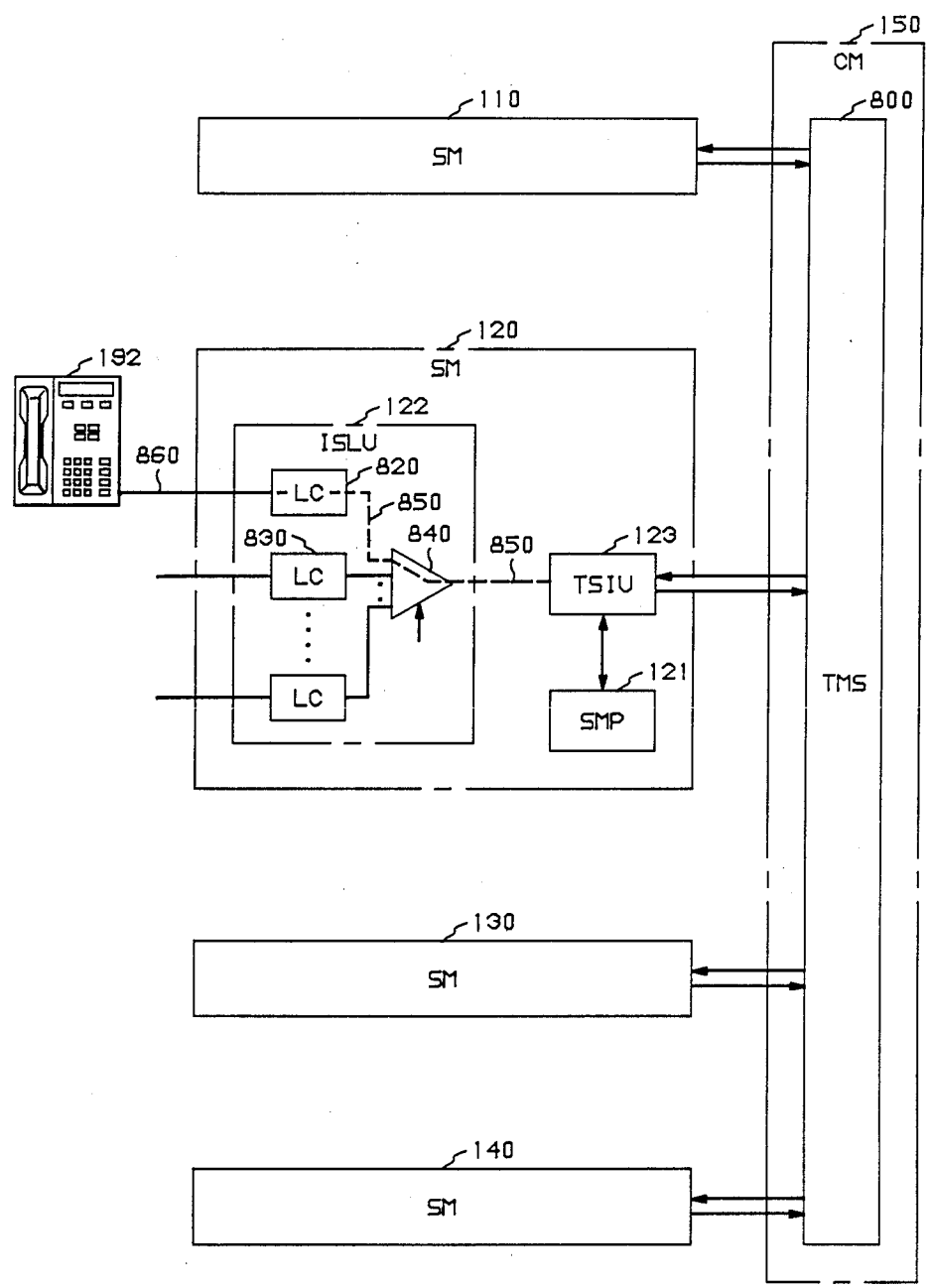
FIG. 8 is a more detailed depiction of one of the switching modules and the communication module of FIG. 1 showing a partial system connection established through the switching module to one of the terminals connected to the switching module.

Process TMSP111 passes the MGLN_TERM message to the terminating system process TMSP121 in control unit 121 of switching module SM120. Switching module 120 is the switching module to which terminal 192 is connected. A route reason field in the MGLN_TERM message is set to a value that indicates that this is a route to a port other than the port for the lead terminal. This reason field is used to guide the processing of the call. Process TMSP121 creates a terminating terminal process TTP1 in control unit 121. The terminating terminal process TTP1 will exist only for the duration of this call to directory number DN11. Since terminal 192 has been determined as the preferred terminal, an initial system 100 connection is established from the originating switch module for the call to terminal 192. This initial connection is established because terminal 192, as the preferred terminal, is identified as the terminal most likely to answer the call. Communication module 150 includes a time-multiplexed-switch TMS800 (FIG. 8), which provides 64 kilobits per second circuit-switched paths between the switching modules. The initial system 100 connection is established from the originating switch module for the call through TMS 800 to TSIU 123 in switching module 120. From TSIU 123 a path 850 (FIG. 8) is established through a series of switches 840 in ISLU 122 to line card 820. Terminal 192 is connected to line card 820. However, the final connection from line card 820 to terminal 192 is not completed until answer occurs.

Process TTP1 transmits a set-up message to terminal 192 to offer the call. Next, the call is offered to all other terminals in the key-system group. Each control unit that services terminals that are members of key-system groups has a system process called the shared call system process. This system process performs various functions involved in processing calls to terminals belonging to a key-system group. Process TTP1 causes a message to be sent to the shared call system process in each control unit associated with the terminals of key-system group 190 informing them of the call. In response to this message, each shared call system process transmits a message to its associated terminals to offer the call. In response, each of the terminals begins to alert.

At this point, any of the terminals in the key-system group may answer the call. System 100 has predicted that terminal 192 will answer the call. If this terminal answers the call, better performance results since the system connection is already established. However, any of the other terminals may answer.

The terminal that answers the call will subsequently be identified as the preferred terminal. If terminal 192 answers the call to directory number DN11, terminal 192 remains the preferred terminal. However, if a terminal other than terminal 192 answers the call, the other terminal becomes the preferred terminal for serving subsequent calls.

Assume that terminal 192 answers this call. When the customer at terminal 192 answers the call, a message is sent from terminal 192 to process TTP1 in control unit 121. A path was already established from the originating point for this call through switching system 100 to ISLU 122. In response to the answer request from terminal 192, process TTP1 completes connection 860 (FIG. 8) from ISLU 122 to terminal 192. Process TTP1 also causes a message (indicating that the call has been answered) to be sent to the shared call system process in each control unit serving terminals in key-system group 190 to inform them that the call has been answered.

This message also triggers the lead control unit to update the history and status data. Although any of the terminals may be identified as the preferred terminal, the lead terminal designation still determines which control unit is the lead control unit. Dynamic history and status data for the key-system group are stored in the lead control unit. This data includes the last answer bit string and the lead performance bit string.

The message indicating that the call to directory number DN11 was answered by terminal 192 is received by the shared call system process SCSP111 in control unit 111. In response to this message, process SCSP111 updates the last answer bit string and the lead performance bit string for key-system group 190. Process SCSP111 uses the procedure defined by the flow chart of FIG. 6 to make this update. First, process SCSP111 reads the last answer bit string for key-system group 190. Process SCSP111 updates this bit string to indicate that terminal 192 was the last terminal to answer a call for this key-system group. Process SCSP111 writes this updated bit string back to memory 116..

Process SCSP111 reads the lead performance bit string for key-system group 190. This bit string is defined in block 460 of FIG. 4. The bit string is set to "00001010." Process SCSP111 saves the high order bit, shifts the bit string one position to the left, and zero fills the rightmost bit position. Next, the process replaces the new high order bit with the saved bit. The bit string resulting from these operations is "00010100." Process SCSP111 checks if the lead terminal was the preferred terminal for this call. The process determines the preferred terminal by reading the per-call data stored for the call when the preferred terminal was initially selected. The lead terminal was not the preferred terminal so process SCSP111 checks whether the lead terminal answered the call. The lead terminal did not answer the call so even though the lead terminal was not the preferred terminal, it did not receive poor service. Accordingly, process SCSP111 leaves the low order bit set of zero.

Process SCSP111 checks whether throttling must be activated or deactivated. The high order bit of the lead performance bit string is examined. The high order bit is set to zero so throttling is not activated. Process SCSP111 checks the seven low order bits to see if throttling should be activated. These bits include only two 1s so throttling is not required. Process SCSP111 writes the updated lead performance bit string to memory 116.

Assume another call arrives for directory number DN11. As described above, as a result of the translation of the called directory number DN11, an MGLN_TERM message is received by process TMSP111. Process TMSP111 effects a reading of call appearance busy/idle table 400 to determine if an idle call appearance is available. Assume that the first call to directory number DN11 has ended and that call appearance CA1 is idle. The status of this call appearance is changed from idle to busy in busy/idle table 400. Next, process TMSP111 determines to which terminal in the key-system group the initial path for the call should be assigned. Terminal 192 has remained the preferred terminal so in executing the procedure defined by the flow chart of FIG. 5, process TMSP111 determines that the initial path should be assigned to terminal 192. Process TMSP111 passes the MGLN—TERM message to the terminating system process TMSP121. As in the first example, the route reason field in the MGLN—TERM message is set to a value that indicates that this is a route to a port other than the port for the lead terminal. Process TMSP121 creates a terminating terminal process TTP2 in control unit 121 to handle this call. The initial system connection is established from the originating point for the call through the system to ISLU 122 as described above. The procedure discussed above is used to offer the call to terminal 192 and to other terminals in the key-system group.

Assume that terminal 191 answers this call. When the user at terminal 191 answers the call, a message is sent to a shared call system process SCSP111 in control unit 111. In response, the shared call system process creates a terminating terminal process in control unit 111 to handle the call. Notice that a new path will have to be established to allow terminal 191 to answer the call. The initial path was established to switching module 120 rather than switching module 110. The user at terminal 191 has an increased probability of experiencing answer delay since the path set-up must be performed after the answer request.

The shared call system process also sends a message indicating that the call has been answered to terminating terminal process TTP2 in control unit 121. This is the terminating terminal process that was created to handle the call in the control unit that serves the preferred terminal. Process TTP2 sends messages to the shared call system processes in all control units serving terminals in the key-system group to indicate that the call has been answered.

In response to receipt of the message from process TTP2 indicating the call has been answered by terminal 191, the shared call system process SCSP111 in the lead control unit 111 updates the last answer bit string and the lead performance bit string for key-system group 190. This is done using the procedure defined by the flow chart of FIG. 6. First, process SCSP111 reads the last answer bit string, updates the bit string to indicate that terminal 191 answered the last call, and writes the updated bit string back to memory 116. Next, process SCSP111 reads the lead performance bit string for key-system group 190. The value of the lead performance bit string after the update for the first call to directory number DN11 is "00010100." Process SCSP111 saves the high order bit and rotates the remaining bits one position to the left, filling the rightmost bit with a zero. Process SCSP111 overwrites the high order bit of the new bit string with the saved bit. The resulting bit string is "00101000."

Process SCSP111 determines if the lead terminal was the preferred terminal for this call by reading the per-call data stored for the call defining the preferred terminal originally selected. The lead terminal was not the preferred terminal so process SCSP111 checks if the lead terminal answered the call. Since, in this case, the lead terminal answered the call, process SCSP111 must indicate an occurrence of unsatisfactory service at the lead terminal. The lead terminal answered a call when it was not originally assigned a path for the call. Process SCSP111 sets the low order bit and the lead performance bit string to 1 to indicate this occurrence of unsatisfactory service.

Process SCSP111 checks if throttling is currently activated by examining the high order bit of the lead performance bit string. This bit is set to zero so throttling is not activated. Process SCSP111 determines if throttling should be activated based on the past performance of the procedure for assigning paths. Process SCSP111 checks if there have been three or more occurrences of unsatisfactory service in the past seven recorded calls. This is indicated by three or more of the seven low order bits of the lead performance bit string being set to 1. Three of the bits are set to 1 so process SCSP111 determines that throttling must be activated. Process SCSP111 activates throttling by setting the high order bit of the lead performance bit string to 1. Process SCSP111 writes the updated lead performance bit string, which now has a value of "10101001," to memory 116.

Throttling is activated for subsequent calls for directory number DN11 shared by key-system group 190. Because throttling is activated, the initial system connection will be established to the lead terminal. This will continue until throttling is deactivated. The preferred terminal continues to be determined so that a comparison can be made when the lead performance bit string is updated to determine if the preference procedure has started to provide satisfactory performance for the lead terminal.

The above-described procedures are merely illustrative of the principles of the present invention and many variations may be devised by those skilled in the art without departing from the spirit and scope of the invention. It is therefore intended that such variations be included within the scope of the claims.

I claim:

1. In a switching system connectable to a plurality of terminals, a method of processing calls to a directory number shared by a multiple number of said terminals, said method comprising the following steps:

selecting, based on call answering activity, a preferred terminal of said multiple terminals to serve a subsequent call to said directory number;

before receiving an answer request from any of said multiple terminals for an incoming call to said directory number, establishing at least a partial connection to said preferred terminal, said connection for use in answering said incoming call at said preferred terminal; and enabling other of said multiple terminals to answer said incoming call.

2. A method in accordance with claim 1 further comprising the following step:

changing, in response to one of said other terminals answering said incoming call, the preference among said multiple terminals to designate said one terminal as the preferred terminal to serve a subsequent call to said directory number.

3. A method in accordance with claim 1 further comprising the following step:

maintaining history data defining call answering activity at said multiple terminals; and wherein said selecting step comprises selecting, based on said history data, one of said multiple terminals as the preferred terminal to serve a subsequent call to said directory number.

4. A method in accordance with claim 3 wherein said history data defines the last one of said multiple terminals to answer a call and wherein said selecting step comprises selecting the terminal defined by said history data to be the last terminal to answer a call as the preferred terminal to serve a subsequent call to said directory number.

5. A method in accordance with claim 4 wherein said method further comprises updating said history data, in response to receipt of an answer signal from one of said multiple terminals for a call, to define said answering terminal as the last terminal of said terminals to answer a call.

6. A method in accordance with claim 4 wherein said history data defines the last one of said multiple terminals to answer a call to said directory number and wherein said selecting step comprises selecting the terminal defined by said history data to be the last terminal to answer a call to said directory number, as the preferred terminal for serving a subsequent call to said directory number.

7. A method in accordance with claim 3 wherein said history data defines call answering activity by said multiple terminals for answering the last N calls to said directory number, N being a positive integer greater than one.

8. A method in accordance with claim 1 wherein said selecting step comprises predicting, based on said call answering activity, the one of said multiple terminals that will answer a subsequent call to said directory number; and selecting said predicted terminal as said preferred terminal.

9. A method in accordance with claim 1 wherein said establishing step comprises establishing at least a partial connection for use in answering said incoming call at a predefined one of said other terminals and at least a partial connection for use in answering said incoming call at said preferred terminal.

10. A method in accordance with claim 1 wherein said establishing step comprises when a predefined terminal is selected as said preferred terminal, establishing at least a partial connection to said predefined terminal, said connection for use in answering said incoming call at said predefined terminal, and when said preferred terminal is one of said multiple terminals other than said predefined terminal, establishing at least a partial connection to said predefined terminal for use in answering said call at said predefined terminal and at least a partial connection to said preferred terminal for use in answering said call at said preferred terminal.

11. A method in accordance with claim 1 wherein said selecting step comprises selecting, based on said call answering activity, at least a first preferred one and a second preferred one of said multiple terminals; and wherein said establishing step comprises establishing at least a partial connection for use in answering said incoming call at said first preferred terminal and at least a partial connection for use in answering said incoming call at said second preferred terminal.

12. A method in accordance with claim 1 further comprising the following steps:

recording occurrences in which a predefined one of said multiple terminals answers a call to said directory number when another of said multiple terminals is selected as the preferred terminal; and establishing, in response to the frequency of the recorded occurrences exceeding a first predefined threshold, at least parital connections to said predefined terminal for a plurality of subsequent calls to said directory number for use in answering said subsequent calls at said predefined terminal.

13. A method in accordance with claim 12 further comprising the following steps:

after said first predefined threshold is exceeded, continuing to record occurrences in which said predefined terminal answers a call to said directory number when another of said multiple terminals is selected as the preferred terminal;

selecting, in response to the frequency of the recorded occurrences falling below a second predefined threshold and based on call answering activity, a next preferred terminal of said multiple terminals to service a subsequent call to said directory number; and before receiving an answer request from any of said multiple terminals for a following incoming call to said directory number, establishing at least a partial connection to said next preferred terminal, said connection for use in answering said following incoming call at said next preferred terminal.

14. A method in accordance with claim 1 wherein said enabling step comprises transmitting a message to each of said multiple terminals requesting each of said multiple terminals to alert in response to said incoming call.

15. In a switching system connectable to a plurality of terminals, said system including a first and a second set of instructions for selecting a preferred terminal, a method of processing calls to a directory number shared by a multiple number of said terminals, said method comprising the following steps:

selecting, based on said first set of instructions, a first preferred terminal of said multiple terminals to serve an incoming call to said directory number;

before receiving an answer request from any of said multiple terminals for said incoming call to said directory number, establishing at least a partial connection to said first preferred terminal, said connection for use in answering said incoming call at said first preferred terminal;

enabling other of said multiple terminals than said first preferred terminal to answer said incoming call;

selecting, based on said second set of instructions, a second preferred terminal of said multiple terminals to serve a subsequent call to said directory number;

before receiving an answer request from any of said multiple terminals for said subsequent call, establishing at least a partial connection to said second preferred terminal, said connection for use in answering said subsequent call at said second preferred terminal; and enabling other of said multiple terminals than said second preferred terminal to answer said subsequent call.

16. A method in accordance with claim 15 wherein said first set of instructions is executed during a first predefined time period and said second set of instructions is executed during a second predefined time period.

17. In a switching system connectable to a plurality of terminals, a method of processing calls to a directory number shared by a multiple number of said terminals, said method comprising the following steps:

said system selecting, based on predetermined selection criteria and at least one dynamic system parameter, a preferred terminal of said multiple terminals to serve a subsequent call to said directory number, before receiving an answer request from any of said multiple terminals for an incoming call to said directory number, said system establishing at least a partial connection to said preferred terminal, said connection for use in answering said incoming call at said preferred terminal; and said system enabling other of said multiple terminals to answer said incoming call.

18. A method in accordance with claim 17 wherein said dynamic system parameter is time of day.

19. In a distributed control switching system connectable to a plurality of terminals, said system comprising a plurality of control units each associated with a different subset of said terminals and for controlling connections to and from its associated subset of said terminals, a method of processing an incoming call to a directory number shared by a key-system group of said terminals associated with multiple ones of said control units, said method comprising the following steps:

a lead one of said multiple control units maintaining history data defining call answering activity for said shared directory number;

in response to said incoming call, said lead control unit selecting, based on said history data, a preferred terminal of said multiple terminals to serve said incoming call;

said lead control unit determining the control unit associated with said preferred terminal;

said determined control unit causing at least a partial connection to be established from an originating point for said call in said system to said preferred terminal, said connection for use in answering said call at said preferred terminal;

said multiple control units cooperating to enable other of said group of terminals to process said incoming call;

said multiple control units cooperatively informing each other and said group of terminals of the status of said incoming call; and responsive to receipt of a message indicating that said incoming call has been answered at one of said group of terminals, said lead control unit updating said history data.

20. A method in accordance with claim 19 wherein said history data comprises a last answer bit string defining the last one of said multiple terminals to answer a call and wherein said selecting step comprises selecting the terminal defined by said last answer bit string to be the last terminal to answer a call as the preferred terminal to serve a subsequent call to said directory number, and wherein said updating step comprises updating said last answer bit string to define said one terminal as being the last terminal of said multiple terminals to answer a call.

21. Apparatus for processing calls to a directory number shared by a multiple number of terminals, comprising:

a switching system connectable to said multiple terminals; and control means for controlling establishment of connections through said switching system;

wherein said control means is operable under the control of a program for controlling the following operations:

selecting, based on call answering activity, a preferred terminal of said multiple terminals to serve a subsequent call to said directory number;

before receiving an answer request from any of said multiple terminals for an incoming call to said directory number, establishing at least a parital connection to said preferred terminal, said connection for use in answering said incoming call at said preferred terminal; and enabling other of said multiple terminals to answer said incoming call.

22. The apparatus of claim 21 wherein said control means is further operable under the control of said program for controlling the following operation:

changing, in response to one of said other terminals answering said incoming call, the preference among said multiple terminals to designate said one terminal as the preferred terminal to serve a subsequent call to said directory number.

23. The apparatus of claim 21 wherein said control means is further operable under the control of said program of controlling the following operation:

maintaining history data defining call answering activity at said multiple terminals; and wherein said selecting step comprises selecting, based on said history data, one of said multiple terminals as the preferred terminal to serve a subsequent call to said directory number.

24. The apparatus of claim 21 wherein said control means is further operable under the control of said program for controlling the following operations:

recording occurrences in which a predefined one of said multiple terminals answers a call to said directory number when another of said multiple terminals is selected as the preferred terminal;

establishing, in response to the frequency of the recorded occurrences exceeding a first predefined threshold, at least partial connections to said predefined terminal for a plurality of subsequent calls to said directory number for use in answering said subsequent calls at said predefined terminal.

25. The apparatus of claim 24 wherein said control means is further operable under the control of said program for controlling the following operations:

after said first predefined threshold is exceeded, continuing to record occurrences in which said predefined terminal answers a call to said directory number when another of said multiple terminals is selected as the preferred terminal;

selecting, in response to the frequency of the recorded occurrences falling below a second predefined threshold and based on call answering activity, a next preferred terminal of said multiple terminals to service a subsequent call to said directory number; and before receiving an answer request from any of said multiple terminals for a following incoming call to said directory number, establishing at least a partial connection to said next preferred terminal, said connection for use in answering said following incoming call at said next preferred terminal.

* * * * *